(12) United States Patent
Jiang

(10) Patent No.: US 11,285,793 B2
(45) Date of Patent: Mar. 29, 2022

(54) AUTOMOBILE SUN-SHADING DEVICE

(71) Applicant: Yunlong Jiang, Zhejiang (CN)

(72) Inventor: Yunlong Jiang, Zhejiang (CN)

(73) Assignee: WENZHOU BENQI TECHNOLOGY CO., LTD., Wenzhou (CN)

( * ) Notice: Subject to any disclaimer, the term of this patent is extended or adjusted under 35 U.S.C. 154(b) by 169 days.

(21) Appl. No.: 15/758,304

(22) PCT Filed: Jun. 16, 2016

(86) PCT No.: PCT/CN2016/085958
§ 371 (c)(1),
(2) Date: Mar. 7, 2018

(87) PCT Pub. No.: WO2017/041561
PCT Pub. Date: Mar. 16, 2017

(65) Prior Publication Data
US 2018/0251015 A1 Sep. 6, 2018

(30) Foreign Application Priority Data
Sep. 8, 2015 (CN) .......................... 201520687511.5

(51) Int. Cl.
*B60J 11/04* (2006.01)
(52) U.S. Cl.
CPC .................. *B60J 11/04* (2013.01)
(58) Field of Classification Search
CPC ..... B60J 11/00; E04F 10/067; E04F 10/0622; E04F 10/0662; E04F 10/0651; E04F 10/0648; E04F 10/0688
See application file for complete search history.

(56) References Cited

U.S. PATENT DOCUMENTS 3,782,443 A * 1/1974 Clauss ................. E04F 10/064
160/22
3,952,758 A * 4/1976 Addison ................. B60P 3/343
135/88.07

(Continued)

FOREIGN PATENT DOCUMENTS

CN 101177116 A 5/2008
CN 101234596 A 8/2008

(Continued)

OTHER PUBLICATIONS

International Search Report dated Aug. 25, 2016, PCT Application No. PCT/CN2016/085958, 3 pages.

*Primary Examiner* — Daniel P Cahn
*Assistant Examiner* — Abe Massad
(74) *Attorney, Agent, or Firm* — Cantor Colburn LLP

(57) ABSTRACT

An automobile sun-shading device, comprising a mounting seat, a piece of sun-shading cloth, and a bracket for driving the sun-shading cloth to unfold, wherein the bracket comprises a first bracket and a second bracket movably connected to the first bracket, one end of the first bracket is mounted on the mounting seat, the other end of the first bracket is movably connected to one end of the second bracket, the other end of the second bracket is connected to one end of the sun-shading cloth, the other end of the sun-shading cloth is wound on a rotary shaft, and the first bracket and the second bracket each comprise a foldable connecting rod capable of being automatically unfolded. The sun-shading device is exquisite in structure and better in sun-shading effect.

5 Claims, 3 Drawing Sheets

(56) References Cited

U.S. PATENT DOCUMENTS

| | | | | |
|---|---|---|---|---|
| 4,469,159 | A * | 9/1984 | Lohausen | E04F 10/0618 160/22 |
| 6,056,350 | A * | 5/2000 | Brutsaert | B60P 3/343 135/88.11 |
| 6,363,664 | B1 * | 4/2002 | Brutsaert | E04F 10/0618 135/117 |
| 6,457,508 | B1 * | 10/2002 | Tomita | E04F 10/0618 135/88.12 |
| 7,017,976 | B1 * | 3/2006 | Rutherford | B60P 3/343 160/70 |
| 7,628,194 | B2 * | 12/2009 | Wagner | E04F 10/0622 160/22 |
| 9,534,393 | B2 * | 1/2017 | Cittadine | E04F 10/0618 |
| 2006/0151125 | A1 * | 7/2006 | Llagostera Forns | E04F 10/0611 160/79 |
| 2011/0088855 | A1 * | 4/2011 | Boustani | B60J 11/02 160/370.22 |
| 2014/0048189 | A1 | 2/2014 | Cornew | |

FOREIGN PATENT DOCUMENTS

| | | |
|---|---|---|
| CN | 204263913 U | 4/2015 |
| CN | 104773053 A | 7/2015 |
| CN | 105082962 A | 11/2015 |
| CN | 204895079 U | 12/2015 |
| FR | 2941200 B1 | 7/2010 |
| KR | 20110094364 A | 8/2011 |
| SU | 1537571 A1 | 1/1990 |
| WO | 2007099384 A1 | 9/2007 |

\* cited by examiner

AUTOMOBILE SUN-SHADING DEVICE

CROSS REFERENCE TO RELATED APPLICATION

The present application claims priority to Chinese patent application no. 201520687511.5, filed with the Chinese Intellectual Property Office Sep. 8, 2015, entitled "Automobile Sun-shading Device", which is incorporated herein by reference in its entirety.

TECHNICAL FIELD

The present invention relates to automobile auxiliary equipment, and particularly to an invention of improvement of automobile sun-shading device.

BACKGROUND

In summer, if an automobile is exposed to the sun, it will not only cause damage to elements and appearance of the automobile and affect its service life, but also result in an extremely high temperature inside the automobile, then a user has to firstly turn on an air conditioner to lower the temperature in use, which brings about high fuel consumption, therefore, sun-shading of the automobiles is indispensable in summer. Existing automobile sun-shading devices are quite complex in structure, large in volume, inconvenient in installation and everyday use of the automobile, moreover, the sun-shading effect is poor, and the automobile cannot be completely shaded.

DISCLOSURE OF THE INVENTION

In view of technical problems existing in the prior art, the technical problem to be solved by the present invention is to provide an automobile sun-shading device which is exquisite in structure and better in sun-shading effect.

In order to solve the above technical problems, the present invention is realized through the following technical solutions:

An automobile sun-shading device includes a mounting seat, a piece of sun-shading cloth, and a bracket for driving the sun-shading cloth to unfold, wherein the bracket includes a first bracket and a second bracket movably connected to the first bracket, one end of the first bracket is mounted on the mounting seat, the other end of the first bracket is movably connected to one end of the second bracket, the other end of the second bracket is connected to one end of the sun-shading cloth, the other end of the sun-shading cloth is wound on a rotary shaft, and the first bracket and the second bracket each include a foldable connecting rod capable of being automatically unfolded.

The foldable connecting rod includes a front connecting rod and a rear connecting rod, the front connecting rod and the rear connecting rod are hinged, the front connecting rod is provided with a spring therein, one end of the spring is connected to the front connecting rod, the other end of the spring is connected to a pulling rope, and the other end of the pulling rope is connected to the rear connecting rod, and the spring in the front connecting rod of the first bracket has a higher elastic coefficient than the spring in the front connecting rod of the second bracket.

The foldable connecting rod includes a front connecting rod and a rear connecting rod, the front connecting rod and the rear connecting rod are hinged, and a torsion spring is provided at a place where the front connecting rod and the rear connecting rod are hinged.

The first bracket and the second bracket each further include a supporting rod and a receiving case, the supporting rod is connected to the receiving case through the foldable connecting rod, the receiving case of the first bracket is mounted on the mounting seat, and the receiving case of the second bracket is movably connected to the supporting rod of the first bracket, and the sun-shading cloth is connected to the supporting rod of the second bracket.

The receiving case has a cavity for receiving the foldable connecting rod and the supporting rod, when the sun-shading cloth is folded, the supporting rod and the foldable connecting rod are placed in the cavity, and the receiving case of the second bracket is placed in the cavity of the receiving case of the first bracket.

The foldable connecting rod between the supporting rod and the receiving case is provided in two or more.

The first bracket and the second bracket are hinged, and the first bracket and the second bracket are fixed with a bolt.

The rotary shaft is connected to a motor.

The rotary shaft is provided with a hand wheel, and the hand wheel is provided with a locking component.

The locking component is a positioning pin, and the positioning pin is matched with a positioning hole on the mounting seat.

The bracket and the sun-shading cloth are each provided in two in the front and back.

In the present invention, the sun-shading cloth and mounting brackets are all provided on the mounting seat, therefore, in mounting, it only needs to mount the mounting seat on the roof. When the present invention is used, the sun-shading cloth is expanded through the brackets. The brackets are provided in two layers, one being horizontally provided for shading the top of the automobile, and the other being provided in an inclined way for shading the front portion and the rear portion of the automobile, thus the sun-shading cloth is matched with the profile of the automobile, in this way, the sun-shading effect is better, and sunshine from different angles can be shaded. When the automobile needs to be used, the rotary shaft is rotated to wind the sun-shading cloth on the rotary shaft, and the sun-shading cloth, when being restored, pulls the foldable connecting rods on the brackets to fold the foldable connecting rods. After being folded, the sun-shading cloth and the brackets' volume becomes small, which not only facilitates the mounting, but also has no influence when the automobile is used.

BRIEF DESCRIPTION OF DRAWINGS

In order to illustrate technical solutions of embodiments of the present invention more clearly, accompanying drawings which need to be used in the description of the embodiments will be briefly described below. Apparently, the accompanying drawings described in the following are merely for some embodiments of the present invention, and a person ordinarily skilled in the art still can obtain other accompanying drawings according to these accompanying drawings without paying out inventive effort.

Below the working principle of the present invention and relevant details thereof are further described in combination with accompanying drawings.

DETAILED DESCRIPTION OF EMBODIMENTS

Below, the technical solutions of embodiments of the present invention will be described clearly and completely in conjunction with accompanying drawings of the embodiments of the present invention. Apparently, the described embodiments are merely for some but not all of the embodiments of the present invention. All of other embodiments, which are obtained by a person ordinarily skilled in the art on the basis of the embodiments of the present invention without paying inventive effort, fall within the scope of protection of the present invention.

Figure 1:
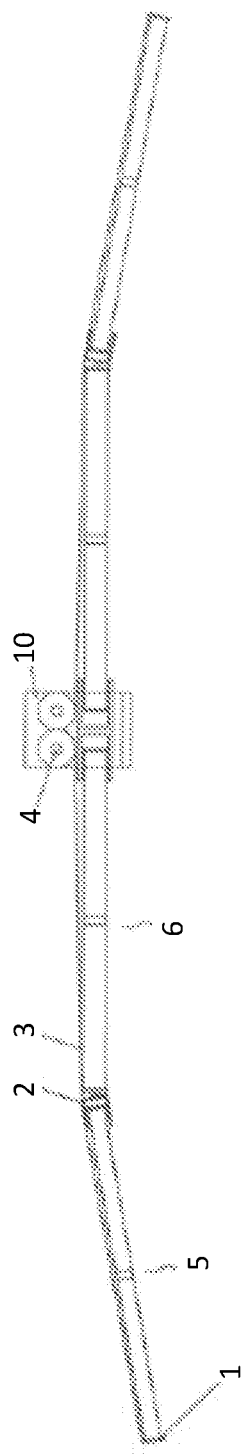
FIG. 1 is a structural schematic diagram of the present invention when being unfolded.
Figure 2:
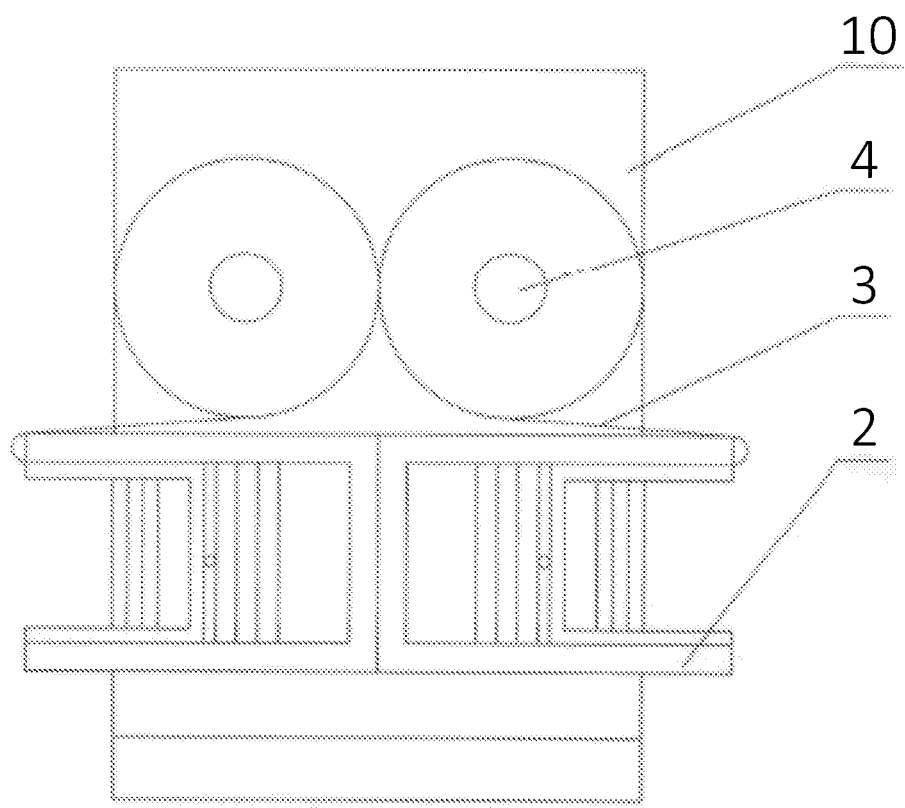
FIG. 2 is a structural schematic diagram of the present invention when being folded.
Figure 3:
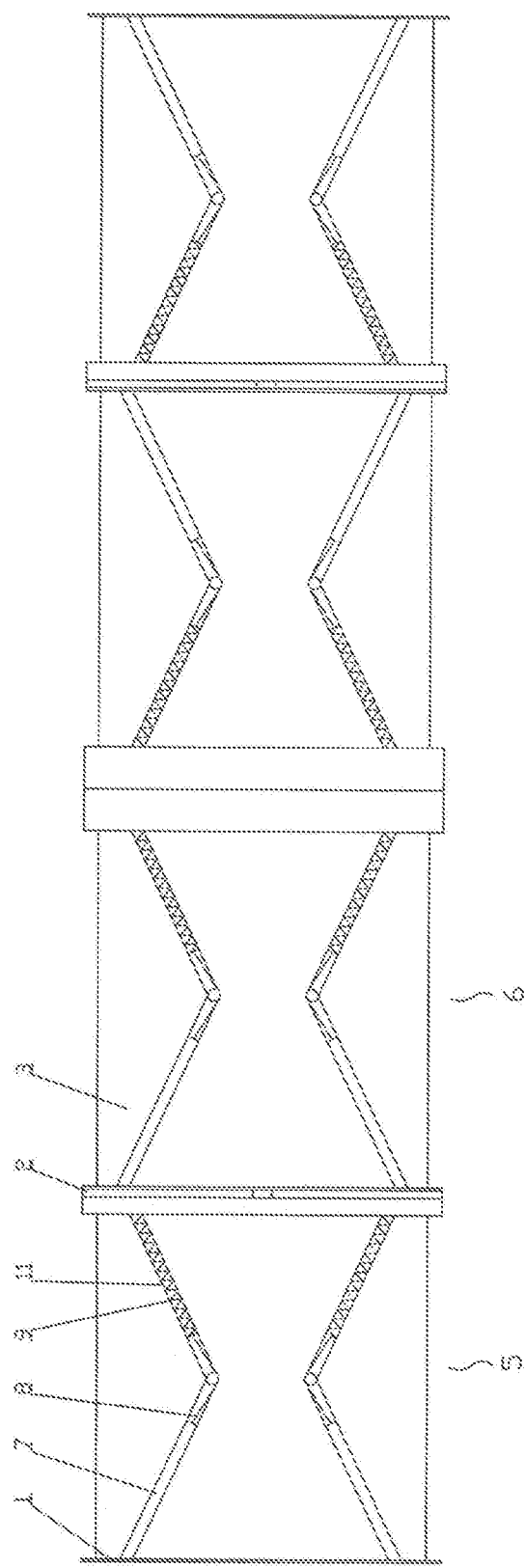
FIG. 3 is a top view of the present invention when being unfolded.

With reference to the figures, an automobile sun-shading device includes a mounting seat 10, a piece of sun-shading cloth 3, and a bracket for driving the sun-shading cloth to unfold. The bracket and the sun-shading cloth 3 are each provided in two in the front and back. The bracket includes a first bracket 6 and a second bracket 5 movably connected to the first bracket. The first bracket 6 and the second bracket 5 each include a supporting rod 1, a receiving case 2, and a foldable connecting rod capable of being automatically unfolded. The supporting rod 1 is connected to the receiving case 2 through the foldable connecting rod, and the foldable connecting rod between the supporting rod 1 and the receiving case 2 is provided in two or more, in this way the foldable connecting rods are more stable when being folded or unfolded. With reference to FIG. 3, two foldable connecting rods are used in the present embodiment; the receiving case of the first bracket 6 is mounted on the mounting seat 10, and the receiving case of the second bracket 5 is movably connected to the supporting rod of the first bracket 6. In the present embodiment, the receiving case 2 and the supporting rod 1 are hinged, and fixed with a bolt, one end of the sun-shading cloth 3 is connected to the supporting rod of the second bracket 5, the other end of the sun-shading cloth 3 is wound on a rotary shaft 4, the rotary shaft 4 is connected to a motor, thus realizing automatic folding and automatic unfolding of the sun-shading cloth. The rotary shaft 4 also can be manually rotated, that is, a hand wheel is mounted on the rotary shaft, a locking component is provided on the hand wheel, wherein the locking component is a positioning pin, which is matched with a positioning hole on the mounting seat (not shown in the figures), the sun-shading cloth is folded by manually rotating the rotary shaft 4, and after the folding is completed, the positioning pin on the hand wheel is inserted and locked in the positioning hole on the mounting seat, thus preventing the hand wheel from rotating reversely. Since the automobile has a relatively high roof, and relatively low front end and rear end, it is a slope from the front end and the rear end to the roof of the automobile. In order to enable the sun-shading cloth to completely shade the automobile, the second bracket 5 should be provided in an inclined way, and since an upper end of the automobile generally has a relatively small radian and is relatively smooth, the first bracket 6 can be provided horizontally, or slightly inclined. In mounting, an inclination angle of the second bracket 5 should be adjusted according to the automobile model, that is, the position of the second bracket 5 is adjusted by rotating the second bracket, and the second bracket is fixed with a bolt after the position is determined.

The foldable connecting rod includes a front connecting rod 11 and a rear connecting rod 7. The front connecting rod 11 and the rear connecting rod 7 are hinged. The front connecting rod 11 is provided with a spring 9 therein, one end of the spring 9 is connected to the front connecting rod 11, the other end of the spring 9 is connected to a pulling rope 8, and the other end of the pulling rope 8 is connected to the rear connecting rod 7. The spring in the front connecting rod of the first bracket has a higher elastic coefficient than the spring in the front connecting rod of the second bracket, thus, when the foldable connecting rod expands, the first bracket 6 expands first, then the second bracket 5 expands; when the foldable connecting rod is folded, the second bracket 5 is folded first, then the first bracket 6 is folded, in this way, neither the expanding nor the folding of the brackets will come into contact with the automobile, preventing the automobile from being damaged. The receiving case 2 has a cavity for receiving the foldable connecting rod and the supporting rod. When the sun-shading cloth 3 is folded, the supporting rod 1 and the foldable connecting rod are placed in the cavity, and the receiving case of the second bracket 5 is placed in the cavity of the receiving case of the first bracket 6, in this way, the sun-shading cloth 3, after being folded, and the foldable connecting rod, after being folded, are both placed in the receiving case of the first bracket, thus the whole device has a quite small volume, is convenient to mount, does not affect the driving of the automobile, and also renders a more beautiful appearance.

In the present embodiment, as an optional example, the front connecting rod and the rear connecting rod are hinged, and a torsion spring is provided at a place where the front connecting rod and the rear connecting rod are hinged. The front connecting rod 11 and the rear connecting rod 7, when being compressed, press the torsion spring, and when an external force disappears or is reduced, the torsion spring restores an original form so that the front connecting rod 11 and the rear connecting rod 7 expand automatically.

In the mounting of the present invention, it only needs to mount the mounting seat on the roof through a sucker or a bolt, which mounting is quite convenient and fast. For first-time use, firstly the inclination angle of the second bracket 5 is adjusted according to the automobile model, and the second bracket is positioned, and the inclination angle does not need to be adjusted again when the automobile is used in the future. In use, the motor is started to drive the rotary shaft 4 to rotate, the sun-shading cloth 3 is released gradually, the brackets in the front and back of the automobile expand respectively, that is, the spring 9 in the front connecting rod of the foldable connecting rod is restored, and the foldable connecting rod expands. Since the spring of the first bracket has a relatively high elastic coefficient, the spring of the first bracket pushes the supporting rod and the second bracket to expand, so that the sun-shading cloth is unfolded, at which time, the rotary shaft rotates reversely, and after the first bracket completely expands, the foldable connecting rod of the second bracket likewise expands under the pulling of the spring, thus, the sun-shading cloth completely covers an upper portion of the automobile, and an expanding shape of the sun-shading cloth is matched with the profile of the automobile, thus the sun-shading effect is better. In folding, the motor rotates in a reverse direction, the rotary shaft enables the sun-shading cloth to be folded, the sun-shading cloth forces the foldable connecting rods to be folded, and finally the foldable connecting rods are folded and placed in the receiving case of the first bracket. The present invention, after being folded, is quite small and exquisite in appearance, and will not affect the use of the automobile or driver's sight, thus ensuring driving safety.

Although the embodiments of the present invention are disclosed as above, it is not merely limited to the application listed in the description and the embodiments, while it absolutely can be applied to various fields to which the present invention is adapted. For a person familiar with the present art, other modifications can be easily realized, thus, the present invention is not limited to the specific details or legends shown and described herein without departing from the general concept defined by the claims and equivalent scope thereof.

What is claimed is:

1. An automobile sun-shading device, comprising:
a mounting seat (10) having a front and a back;
a first sun-shading cloth (3) comprising a first end and a second end;
a second sun-shading cloth comprising a first end and a second end;
a first rotary shaft and a second rotary shafts (4) disposed at the front and the back of the mounting seat, respectively; and
front and back brackets for driving the first and second sun-shading cloths to unfold, wherein
the front bracket comprises a first bracket (6) comprising a first end and a second end and a second bracket (5) hinged to the first bracket and comprising a first end and a second end, wherein the first end of the first bracket (6) is mounted on the front of the mounting seat (10), the second end of the first bracket (6) is hinged to the first end of the second bracket (5), the second end of the second bracket (5) is connected to the second end of the first sun-shading cloth (3), the first end of the first sun-shading cloth (3) is wound on the first rotary shaft (4), and the first bracket (6) comprises a first foldable connecting rod capable of being automatically unfolded and the second bracket (5) comprises a second foldable connecting rod capable of being automatically unfolded, and
the back bracket comprises a first bracket comprising a first end and a second end and a second bracket hinged to the first bracket and comprising a first end and a second end, wherein the first end of the first bracket is mounted on the back of the mounting seat, the second end of the first bracket is hinged to the first end of the second bracket, the second end of the second bracket is connected to the second end of the second sun-shading cloth, the first end of the second sun-shading cloth is wound on the second rotary shaft, and the first bracket comprises a first foldable connecting rod capable of being automatically unfolded and the second bracket comprises a second foldable connecting rod capable of being automatically unfolded,
wherein each of the first brackets (6) and each of the second brackets (5) further comprise: a supporting rod (1); and a receiving case (2), wherein the supporting rod (1) of each first bracket is connected to the receiving case of each first bracket through the first foldable connecting rod of each first bracket, and the supporting rod (1) of each second bracket (5) is connected to the receiving case (2) of each second bracket (5) through the second foldable connecting rod of each second bracket, and the receiving cases of the first brackets are mounted on the mounting seat (10), the receiving case of each second bracket is hinged to the supporting rod of each first bracket, and the second sun-shading cloth (3) is connected to the supporting rod of the second bracket (5) of the back bracket, wherein the receiving case of each second bracket has a length substantially equal to a length of the supporting rod of each first bracket,
wherein the first and second rotary shafts (4) are arranged above the first ends of the first brackets (6) mounted on the mounting seat (10),
wherein the first foldable connecting rod and the second foldable connecting rod of each of the first and second brackets each comprise:
a pulling rope;
a front connecting rod (11); and
a rear connecting rod (7),
wherein the front connecting rod (11) and the rear connecting rod (7) are hinged, the front connecting rod (11) is provided with a spring (9) therein, a first end of the spring (9) is connected to the front connecting rod (11), a second end of the spring (9) is connected to a first end of the pulling rope (8), and a second end of the pulling rope (8) is connected to the rear connecting rod (7), and the spring of each first bracket has a higher elastic coefficient than the spring of each second bracket.

2. The automobile sun-shading device of claim 1, wherein, for each of the first and second brackets, the first and second foldable connecting rods between each supporting rod (1) and each receiving case (2) are each provided as two or more foldable connecting rods, respectively.

3. The automobile sun-shading device of claim 1, wherein:
each receiving case (2) has a cavity for receiving a corresponding one of the foldable connecting rods and a corresponding one of the supporting rods, and
when the first and second sun-shading cloths (3) are folded, the supporting rod and the foldable connecting rod are placed in the cavity and the receiving case of the second bracket is placed in the cavity of the receiving case of the first bracket.

4. The automobile sun-shading device of claim 1, wherein each first bracket (6) and each second bracket (5) are hinged together with a bolt.

5. An automobile sun-shading device, comprising:
a mounting seat having a front and a back;
first and second sun-shading cloths, each comprising a first end and a second end;
first and second rotary shafts disposed at the front and the back of the mounting seat, respectively; and
front and back brackets for driving the first and second sun-shading cloths to unfold,
wherein:
each of the front and back brackets comprises a first bracket comprising a first end and a second end and a second bracket hinged to the first bracket and comprising a first end and a second end, wherein the first end of the first bracket of the front bracket is mounted on the front of the mounting seat and the first end of the first bracket of the back bracket is mounted on the back of the mounting seat, the second end of each first bracket is hinged to the first end of each second bracket and the second end of each second bracket is connected to the second end of a corresponding one of the first and second sun-shading cloths,
the first ends of the first and second sun-shading cloths are respectively wound on the first and second rotary shafts, and
each first bracket comprises a first foldable connecting rod capable of being automatically unfolded and each second bracket comprises a second foldable connecting rod capable of being automatically unfolded,
wherein each of the first brackets (6) and each of the second brackets (5) further comprise: a supporting rod (1); and a receiving case (2), wherein each supporting rod (1) is connected to a corresponding one of the receiving cases (2) through a corresponding one of the first foldable connecting rods, the receiving cases of the first brackets are mounted on the mounting seat (10), the receiving case of each second bracket is hinged to the supporting rod of each first bracket, and the second sun-shading cloth (3) is connected to the supporting rod of the second bracket (5) of the back bracket, wherein the receiving case of each second bracket has a length substantially equal to a length of the supporting rod of each first bracket, wherein the first and second rotary shafts (4) are arranged above first ends of the first brackets (6) mounted on the mounting seat (10), wherein the first foldable connecting rod and the second foldable connecting rod of each of the first and second brackets each comprise:

a pulling rope;

a front connecting rod (11); and a rear connecting rod (7), wherein the front connecting rod (11) and the rear connecting rod (7) are hinged, the front connecting rod (11) is provided with a spring (9) therein, a first end of the spring (9) is connected to the front connecting rod (11), a second end of the spring (9) is connected to a first end of the pulling rope (8), and a second end of the pulling rope (8) is connected to the rear connecting rod (7), and the spring of each first bracket has a higher elastic coefficient than the spring of each second bracket.

\* \* \* \* \*